United States Patent
Narvaez-Gracia et al.

(10) Patent No.: US 12,006,018 B2
(45) Date of Patent: Jun. 11, 2024

(54) AIRCRAFT CABIN COMPONENT AND METHOD FOR MANUFACTURING AN AIRCRAFT CABIN COMPONENT

(71) Applicant: Airbus Operations GmbH, Hamburg (DE)

(72) Inventors: Rafael Narvaez-Gracia, Hamburg (DE); Alejandro Morales Anton, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 848 days.

(21) Appl. No.: 17/057,750

(22) PCT Filed: May 28, 2019

(86) PCT No.: PCT/EP2019/063848
§ 371 (c)(1),
(2) Date: Nov. 23, 2020

(87) PCT Pub. No.: WO2019/229076
PCT Pub. Date: Dec. 5, 2019

(65) Prior Publication Data
US 2021/0206464 A1    Jul. 8, 2021

(30) Foreign Application Priority Data
May 30, 2018  (EP) .................................. 18175087

(51) Int. Cl.
*B64C 1/00*   (2006.01)
*B60Q 3/41*   (2017.01)
(Continued)

(52) U.S. Cl.
CPC ................. *B64C 1/00* (2013.01); *B60Q 3/41* (2017.02); *B64F 5/10* (2017.01); *B29C 59/046* (2013.01)

(58) Field of Classification Search
CPC .. B64C 1/00; B64C 1/066; B60Q 3/41; B64F 5/10; B29C 59/046; B64D 2011/0038; Y02T 50/40
See application file for complete search history.

(56) References Cited

U.S. PATENT DOCUMENTS 5,952,789 A    9/1999  Stewart et al.
6,181,797 B1 *  1/2001  Parrella .................... H04R 5/02
                                                       381/86
(Continued)

FOREIGN PATENT DOCUMENTS

DE    102004026730 A1    12/2005
DE    102006007285 A1    8/2007
DE    102012108956 A1    3/2014

OTHER PUBLICATIONS

International Search Report; priority document.
European Search Report; priority document.

*Primary Examiner* — Michael B Nelson
(74) *Attorney, Agent, or Firm* — Greer, Burns & Crain, Ltd.

(57) ABSTRACT

An aircraft cabin component for use in an aircraft cabin of an aircraft includes a component part having at least one parametric surface. A flexible OLED display assembly adheres to the at least one parametric surface of the component part and fits closely the curvature of the at least one parametric surface. The flexible OLED display assembly comprises a printed electronics layer and an OLED array deposited on the printed electronics layer.

15 Claims, 2 Drawing Sheets

(51) Int. Cl.
  *B64F 5/10*   (2017.01)
  *B29C 59/04*  (2006.01)

(56) References Cited

U.S. PATENT DOCUMENTS

| | | |
|---|---|---|
| 9,558,715 B2 | 1/2017 | Velten et al. |
| 2010/0014009 A1 | 1/2010 | Stavaeus et al. |
| 2016/0191794 A1* | 6/2016 | Varonos ................ H04N 23/54 348/36 |
| 2017/0136944 A1 | 5/2017 | Duce et al. |
| 2017/0254065 A1 | 9/2017 | Jegenbart et al. |

\* cited by examiner

AIRCRAFT CABIN COMPONENT AND METHOD FOR MANUFACTURING AN AIRCRAFT CABIN COMPONENT

CROSS-REFERENCES TO RELATED APPLICATIONS

This application claims the benefit of the International Application No. PCT/EP2019/063848, filed on May 28, 2019, and of the European patent application No. 18175087.8 filed on May 30, 2018, the entire disclosures of which are incorporated herein by way of reference.

FIELD OF THE INVENTION

The present invention pertains to aircraft cabin components, such as lining, ceiling or floor panels, with an integrated multifunctional display. The present invention further pertains to methods for manufacturing such aircraft cabin components.

Although generally applicable to any kind of components, e.g., for use in the transport industry in passenger cabins of landborne, airborne, or waterborne vehicles, or even in buildings or landbased structures, such as discotheques, cinemas, recording studios, concert halls or similar, the present invention and the problem on which it is based will be explained in greater detail with reference to aircraft cabin components for passenger cabins of commercial aircraft.

BACKGROUND OF THE INVENTION

Airlines have an increasing demand to set themselves apart from competitors, particular by fostering an enhanced customer experience. Passengers are to be offered better standards in cabin comfort resulting in improved flight experience and higher customer loyalty. The most freedom and flexibility in design choices where such comfort can be satisfied is in the passenger cabin.

Common passenger aircraft comprise a fuselage that holds such a passenger cabin, the latter containing, amongst others, the passenger seats, the hand luggage compartments, the sanitary facilities and other cabin monuments. The inside of passenger cabins is usually separated from the fuselage, the skin, and other structural parts of the aircraft by a lining with a plurality of lining panels adjoining one another as well as corresponding floor and ceiling panels.

OLED technology for building displays is long known, for example as shown in document U.S. Pat. No. 5,952,789 A. However, media and lighting solutions provided to aircraft passengers based on this technology are usually based on distinct and separate built-in devices that are not, or at least not fully, integrated into the cabin itself. Several attempts have been made to integrate media and lighting systems into passenger cabins such as for example disclosed in documents DE 10 2006 007 285 A1 and DE 10 2012 108 956 A1.

SUMMARY OF THE INVENTION

One of the goals of the present invention is to overcome traditional barriers to integrate media and lighting systems into the structural parts of a passenger cabin, such as shape limitations, fragility, weight, integration complexity and cost.

According to a first aspect of the invention, an aircraft cabin component for use in an aircraft cabin of an aircraft includes a component part having at least one parametric surface, i.e., a surface with a smoothly varying curvature at any point on the surface. A flexible multifunctional electronics assembly adheres to the at least one parametric surface of the component part and fits closely the curvature of the at least one parametric surface, the flexible multifunctional electronics assembly comprising a first printed electronics layer and an OLED assembly deposited on the first printed electronics layer.

According to a second aspect of the invention, an aircraft includes an aircraft cabin equipped with at least one aircraft cabin component in line with the first aspect of the invention and/or an aircraft cabin component assembly comprising at least one aircraft cabin component in line with the first aspect of the invention and an active noise reduction controller coupled to the speakers and the microphones of the at least one aircraft cabin component, the active noise reduction controller being configured to receive noise recorded by the microphones and to output a noise dampening signal destructively interfering with the noise recorded by the microphones to the speakers. The general idea is also applicable to other components such as wall, ceiling or floor components of buildings which are to be shielded from external noise, for example discotheques, concert halls, cinemas, recording studios or similar.

According to a third aspect of the invention, a method for manufacturing an aircraft cabin component for use in an aircraft cabin of an aircraft involves printing an electronics layer on a flexible carrier substrate, printing an OLED array on the printed electronics layer, and depositing the flexible carrier substrate on a parametric surface of a component part so that the flexible carrier substrate adheres to the at least one parametric surface of the component part and fits closely the curvature of the parametric surface. The printing processes may, in particular, be inkjet-printing or transfer-printing processes.

Multiple beneficial effects of the invention are achieved due to the exploitation of the passenger cabin in a full screen cabin concept. The components used for the display, together with organic semiconductors, allow for a seamless match with cabin contours. Moreover, mechanical vibrations that conventional stand-alone displays have to cope with can be effectively dealt with by the structural design of the aircraft cabin components. The integrative approach to designing aircraft cabin components with built-in media and lighting functionality allows for utmost industrial agility and manufacturing speed, for better management of an airline's customization and for effortless integration within the end-to-end supply chain.

Smart aircraft cabin components such as the ones proposed by the invention are able to provide a unique experience for passengers in the aircraft cabin. The combination of organic semiconductors with printed electronics integrated into component part surfaces allow for a host of flexibly designable functions to be embedded into aircraft cabin components. The use of printed electronics ensures economic viability, flexibility, low electrical power consumption and lightness through a non-complex manufacturing known technology.

The combination of OLED technology with printed electronics on flexible substrates provides for excellent brightness, luminosity and color fastness, low power consumption, competitive manufacturing costs and high passenger satisfaction. Perfect adaptation to the contours of the passenger cabin contour is guaranteed thanks to mechanical flexibility of the stack of multifunctional display and electronics layers.

The present invention offers a multitude of advantages for the passenger cabin environment. Due to the possibilities opened up by present invention, separately installed electronic equipment such as separate displays or interactive elements may be avoided or at least significantly reduced in number. Holding components like brackets or similar items may be reduced. In general, reductions in weight and space may be achieved resulting in less resources to be used for the flight of the aircraft as any weight reduction can have significant impact on aircraft load and, in consequence, fuel consumption. Printing processes for the formation of the stack of layers of the multifunctional display provide extraordinary design freedom and offer the possibility to integrally form functional and structural elements into components, which otherwise—within conventional manufacturing—would necessarily require elaborate installation efforts.

Furthermore, the present invention offers several advantages for the general safety and reliability of an electric infrastructure of a passenger cabin. Due to the integrative approach, inspection and maintenance efforts may be significantly reduced. Thus, not only weight, costs, installation and manufacturing efforts can be significantly lowered but also the general reliability of an electrical infrastructure of a passenger cabin can be improved.

According to some embodiments of the aircraft cabin component, the flexible multifunctional electronics assembly may be ultrathin. In some embodiments, the flexible multifunctional electronics assembly may be very flexible, and in particular really flexible. The extraordinary flexibility may be reached by an appropriate choice of materials for the layers of the multifunctional electronics assembly and by keeping the thickness of the layers below a layer thickness upper boundary threshold.

According to some embodiments of the aircraft cabin component, the OLED frontplane may comprise an organic luminescent layer, a cathode layer deposited on the organic luminescent layer and an encapsulation layer deposited on the cathode layer. Such OLED displays advantageously work without a backlight because they emit visible light. Thus, they are able to display deep black levels and can be thinner and lighter than comparable displays based on other technologies such as liquid crystal displays (LCDs). In low ambient light conditions, OLED displays may advantageously achieve an enhanced contrast ratio.

According to some embodiments of the aircraft cabin component, the OLED array may comprise an OLED substrate deposited on the first printed electronics layer, an organic TFT array layer deposited on the OLED substrate and an OLED frontplane deposited on the organic TFT array layer. Such active matrix OLED devices (AMOLEDs) advantageously use a thin-film transistor backplane to directly access and switch each individual OLED pixel, allowing for higher resolution and larger display sizes.

According to some embodiments of the aircraft cabin component, the aircraft cabin component may further comprise a second printed electronics layer deposited on the OLED assembly. Advantageously, transparent electronics layers may be overlaid over the OLED, providing more direct access to the surrounding. Possible applications involve the provision of touch-sensitive electrodes on the OLED display or various environmental sensors for sensing parameters in the vicinity of the aircraft cabin component.

According to some embodiments of the aircraft cabin component, the aircraft cabin component may further comprise a protection cover layer deposited on the second printed electronics layer.

According to some embodiments of the aircraft cabin component, the aircraft cabin component may further comprise a flexible carrier substrate arranged between the at least one parametric surface and the first printed electronics layer of the flexible multifunctional electronics assembly, the material of the flexible carrier substrate exhibiting a strong chemical affinity to the material of the component part. This will allow the multifunctional electronics assembly to be variably adapted to various materials used for the component part. In particular, it will not be necessary to lower one's sights when designing the aircraft cabin component in structural, mechanical and functional aspects since the multifunctional electronics assembly may interface optimally with the component part through the use of a specifically adapted carrier substrate.

According to some embodiments of the aircraft cabin component, the first printed electronics layer may be deposited directly onto the at least one parametric surface of the component part.

According to some embodiments of the aircraft cabin component, the component part may be one of a lining panel, a ceiling panel, a floor panel, a hatrack, a cabin door, a compartment separation module, a window blind, a luggage compartment door, a galley sidewall or a lavatory monument sidewall. That way, essentially all surfaces visible to the passengers in the aircraft cabin may become "smart surfaces", i.e., surfaces with blended transitions among various cabin components creating the impression of a homogeneous display screen. The multifunctional electronics may flexibly fit to singly or doubly curved component surfaces so that the area of the surfaces turned to smart surfaces is maximized while respecting cabin functionalities such air-conditioning outputs, Passenger Supply Units (PSUs) or turbulence handlers (grip-rails).

According to some embodiments of the aircraft cabin component, the first printed electronics layer and/or the second printed electronics layer may comprise one or more of temperature sensors, light intensity sensors, humidity sensors, moisture sensors, pressure sensors, smoke detection sensors, chemical sensors, touch sensors, speakers, antennas, RFID modules, light fidelity modules, memory elements, energy harvesting elements, photovoltaic cells, biosensors and accumulators. Sensors such as for temperature, light intensity, humidity/moisture, pressure, smoke detection, air quality, air/oxygen mixture or air flow speed may allow for a space-resolved in-situ detection of important cabin parameters. Integrated circuits such as electronics controllers, for example for speakers or microphones, may be directly integrated into the aircraft cabin components, avoiding the need for extensive cabling. Touch screens may be directly integrated into the passenger seats' IFE and/or the system panels for crew and flight attendants. Advantageously, Wireless Access Point (WAP) antennas may be integrated into the aircraft cabin component in order to deliver local WIFI Access Points to passengers. Integrated RFID modules may track the life cycle of the component parts during industrial and service phase. Light fidelity modules may advantageously provide wireless communication possibilities to passengers through the use of visible light. Memory elements may store media and/or track the use of tactile components on the surface for purposes of maintenance, repair, cleaning and/or replacement. Accumulators may be advantageously be used in order to segregate the power usage of aircraft cabin components and the respectively integrated electronics from other electric cabin structures. Integrated biosensors may provide for an on-board point-of-healthcare that may be located on a specific area of the cabin in case of health problems of passengers or crew members on board. These biosensors may track human biorhythms such as heartbeat rate, electrochemical levels such as glucose levels.

According to some embodiments of the aircraft cabin component, the aircraft cabin component may further comprise a third printed electronics layer deposited on a surface of the component part opposite to the at least one parametric surface. In some embodiments, the first printed electronics layer may comprise speakers and the third printed electronics layer microphones. According to some embodiments, a second flexible carrier substrate may be arranged between the component part and the third printed electronics layer, the material of the second flexible carrier substrate exhibiting a strong chemical affinity to the material of the component part.

At least one of the aircraft cabin components with a first printed electronics layer including speakers and a third printed electronics layer including microphones may be used in an aircraft cabin component assembly which may further comprise an active noise reduction controller coupled to the speakers and the microphones of the at least one aircraft cabin component, the active noise reduction controller being configured to receive noise recorded by the microphones and to output a noise dampening signal destructively interfering with the noise recorded by the microphones to the speakers. In this way, the aircraft cabin components may become a noise recorder on the fuselage side, while the passenger side will become a full audio-screen. Due to the embedded flexible audio-AMOLED foils on the inside of the aircraft cabin and microphone foils on the outside, aircraft cabin components may perform active noise reduction (ANR) algorithm in order to dampen noises within the aircraft cabin. This advantageously allows implementing in-situ mechanisms for reducing unwanted environmental noises, for example from the engines or mechanical vibrations of the fuselage and airfoil structures.

According to some embodiments of the method, the flexible carrier substrate may comprise a connector tab through which the printed electronics layer and/or the further printed electronics layer may be electrically connected among each and/or to an electronics controller external to the aircraft cabin component. This advantageously allows for an interconnection between multiple aircraft cabin components "behind the scenes", i.e., invisible to the passengers, therefore improving the aesthetic appearance of the OLED displays towards the interior of the aircraft cabin. Additionally, it may be advantageously possible to at partly have the necessary processing operations for a particular aircraft cabin component to be done in processors embedded in the cabin component. Thereby, extensive cabling and complex signaling between the electronics in a cabin component and external controllers may be reduced.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION OF THE PREFERRED EMBODIMENTS

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1:
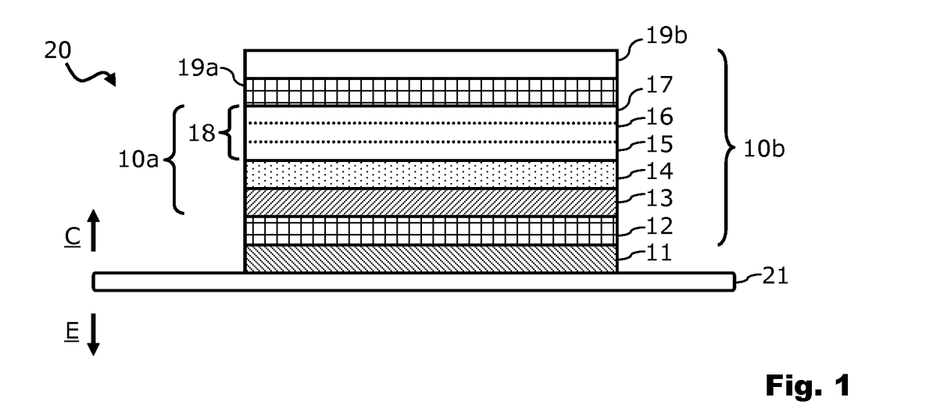
FIG. 1 schematically shows a cross-section through a stack of layers as used in an aircraft cabin component according to some embodiments of the invention.

FIG. 1 schematically shows a cross-section through a stack of layers as used for an aircraft cabin component 20. Aircraft cabin components within the meaning of the present disclosure are any cabin modules with larger surfaces visible to passengers within an aircraft cabin. Such aircraft cabin components may include upper and lower lining panels, ceiling panels, sidewalls, passenger compartment walls, window shutters, hatracks and overhead luggage bins, passenger seats, floor panels, stowaway tables, backrests, headrests, lavatory doors, cabin monuments, galleys, cockpit doors and the like. In particular, aircraft cabin components within the meaning of the present disclosure are cabin parts having a component part surface intended to be facing the interior of an aircraft cabin. Such aircraft cabin components have an at least partly (i.e., sectionally) flat, uniform, level or even surface onto which a flexible multifunctional OLED display assembly may be mounted.

Figure 2:
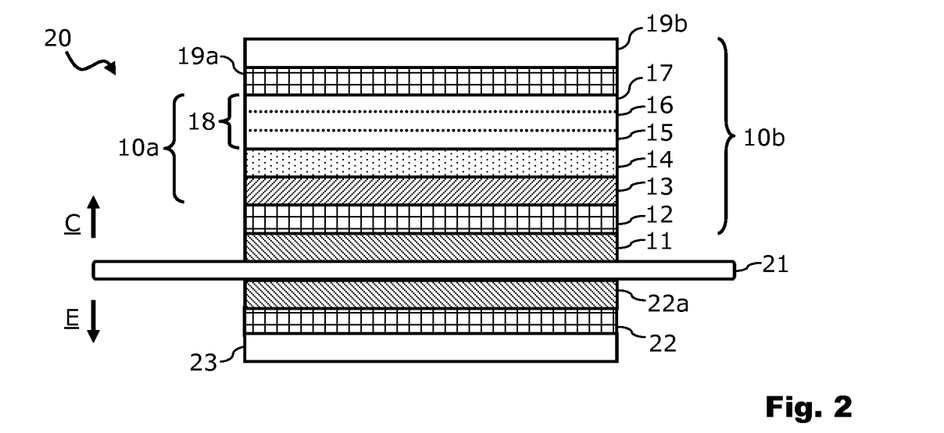
FIG. 2 schematically shows a cross-section through a stack of layers as used in an aircraft cabin component according to further embodiments of the invention.

FIGS. 1 and 2 schematically show a component part 21 as flat part. However, it should be obvious that the component part 21 does not necessarily need to be planar, but could also have an arcuate or curved surface. The component part 21 generally has a certain thickness with a first main surface generally oriented towards the interior C of an aircraft cabin and a second main surface opposite to the first main surface generally facing away from the interior of an aircraft cabin, towards the external part E of the aircraft cabin. Without loss of generality, the first main surface is shown to face upwards in the exemplary illustration of FIGS. 1 and 2, while the second main surface is shown to face downwards. It should, however, be clear that the first and second main surfaces may be oriented in any direction depending on the location and orientation of the aircraft cabin component within an aircraft cabin. The component part 21 may, for example, be manufactured from prepregs and honeycomb cores or injected plastic.

The main surfaces of the component part 21 are in particular parametric surfaces, i.e., surfaces having a smoothly varying curvature at all points on the surface. Such parametric surfaces have a flat, curved or arcuate outer boundary plane on which a multifunctional electronics assembly 10b may be flexibly adhered to. The multifunctional electronics assembly 10b includes a stack of different layers having different functions. All of the layers have an appropriate flexibility that allows the electronics assembly 10b to closely fit the curvature of the parametric surface.

Figure 4:
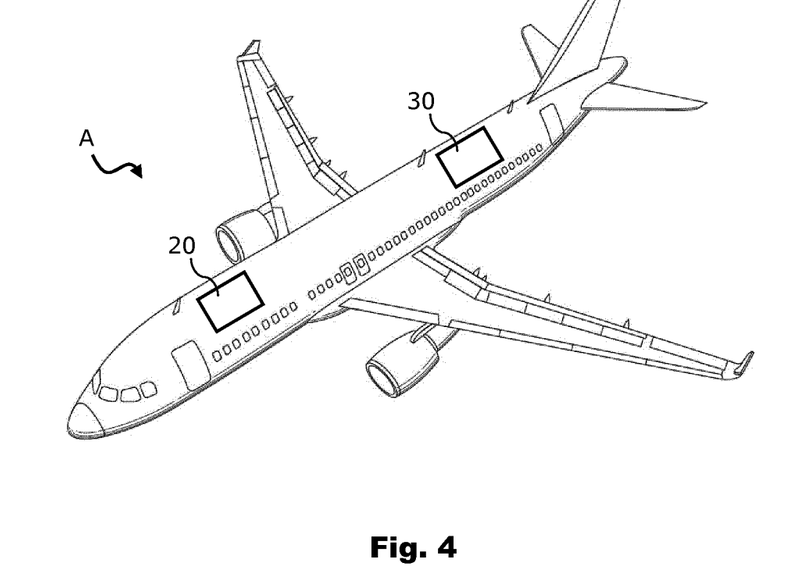
FIG. 4 schematically shows an aircraft with a passenger cabin in which at least one aircraft cabin component and/or an aircraft cabin component assembly according to some embodiments of the invention are installed.

While the multifunctional electronics assembly 10b is shown to only adhere to a portion of the parametric surface of the component part 21, the electronics assembly 10b may extend over essentially the whole surface of the component part 21, particularly any surface portion that is visible from within an aircraft cabin once the aircraft cabin component 20 is installed in an aircraft, such as the aircraft A as illustrated in FIG. 4.

The aircraft cabin component 20 may, for example, be configured as a lining panel to form the lining of a passenger cabin of a passenger aircraft. For example, such a lining panel may be customized as a wall panel, a floor panel, or, for example, a ceiling panel for separating the interior space of the passenger cabin from the structural part and the infrastructure of the aircraft. In other variations, the aircraft cabin component 20 may be customized as a cover for a hatrack or similar stowage space or the like. In the following, the term aircraft cabin component may generally refer to any lining or cladding element generally known from the interior design of aircraft passenger cabins, i.e., components that may serve a basic paneling function for functional or decoration purposes and in addition may provide additional structural or functional advantages. Additionally, the aircraft cabin component may include (entirely or in portions) a hatrack, a cabin door, a compartment separation module, a window blind, a luggage compartment door, a galley sidewall or a lavatory monument sidewall.

As illustrated in FIGS. 1 and 2, a multifunctional electronics assembly may generally comprise a printed electronics layer 12 and an OLED assembly 10a formed thereon. The stack of printed electronics layer 12 and an OLED assembly 10a may be placed on a flexible carrier substrate 11. On top of the OLED assembly 10a, a further printed electronics layer 19a may be placed. The OLED assembly 10a may generally include an OLED substrate 13, an organic TFT array layer 14 and an OLED frontplane 18 including an organic luminescent layer 15, a cathode layer 16, and a protective encapsulation layer 17. In case a further printed electronics layer 19a is provided, a further protective cover 19b may be placed on top of the printed electronics layer 19a, encapsulating and shielding the printed electronics layer 19a. The electronics layer 19a and the protective cover 19b may, in particular, be transparent in order to guarantee visibility on the underlying OLED assembly 10a.

The flexible multifunctional electronics assembly 10b includes various layers, in particular a first printed electronics layer 12 and an OLED assembly 10a deposited on the first printed electronics layer 12. In some examples, the first printed electronics layer 12 may be deposited directly onto the surface of the component part 21. In that case, the first printed electronics layer 12 can be directly printed onto the component part 21 of the aircraft cabin component 20, for example by inkjet-printing or transfer-printing.

In the variations explicitly illustrated in FIGS. 1 and 2, the printed electronics layers 12 and 22 are first printed onto a respective flexible carrier substrate 11 or 22a. The whole stack of layers may then be built up on this carrier substrate 11 first. The final multifunctional electronics assembly can then be shipped to a system integrator who attaches the multifunctional electronics assembly via the carrier substrate 11 to the component part 21.

Specifically, the first printed electronics layer 12 may be supported by a flexible carrier substrate 11 that is arranged on the parametric surface of the component part 21. The material of the flexible carrier substrate 11 may be selected depending on the material of the component part so that the carrier substrate 11 exhibits a strong chemical affinity to the material of the component part 21. Strong chemical affinity may be ensured by choosing materials of different chemical composition that easily aggregate or bond and form a stable bonding zone at their touching surfaces.

The printing process used to print the electronics layer 12 may be used to create electrical devices on a substrate. Printing processes employed therefor may use common printing equipment suitable for defining patterns on material, such as screen printing, flexography, gravure, offset lithography, and inkjet. Electrically functional electronic or optical inks may be deposited on the substrate, creating active or passive devices, such as thin film transistors, capacitors, coils, or resistors.

The electronics components printed in the layer 12 may include organic electronics or plastic electronics, in which one or more inks are composed of carbon-based compounds that can be deposited by solution-based, vacuum-based or other processes. The electronics components may also include organic semiconductors, inorganic semiconductors, metallic conductors, nanoparticles or nanotubes.

For the preparation of the flexible printed electronics layer 12 nearly all industrial printing methods may be employed Similar to conventional printing, printed electronics may apply ink layers one atop another One of the most important benefits of printing is low-cost volume fabrication. Moreover, printing on flexible substrates allows electronics to be placed on curved surfaces.

The functionality of the electronics components in the printed electronics layer 12 may be manifold and implemented as desired for the particular capabilities of the multifunctional electronics assembly 10b: The first printed electronics layer 12 may for example include temperature sensors, light intensity sensors, humidity sensors, moisture sensors, pressure sensors, smoke detection sensors, chemical sensors, touch sensors, speakers, antennas, RFID modules, light fidelity modules, memory elements, energy harvesting elements, photovoltaic cells, biosensors and/or accumulators.

Similarly, the functionality of the electronics components in the other printed electronics layers 19a and 22 may equally be manifold and implemented as desired for the particular capabilities of the aircraft component part: The second and/or third printed electronics layers 19a and 22 may, for example, also include temperature sensors, light intensity sensors, humidity sensors, moisture sensors, pressure sensors, smoke detection sensors, chemical sensors, touch sensors, speakers, antennas, RFID modules, light fidelity modules, memory elements, energy harvesting elements, photovoltaic cells, biosensors and/or accumulators.

The decision which electronics components may be chosen for integration into the first, second or third printed electronics layers 12, 19a and/or 22 may depend on the desired functionality. For example, sensors which may require direct access to the surroundings might be placed into the second printed electronics layer 19*a* the access to the surroundings of which is not hampered by the presence of the OLED assembly 10*a*. In other examples, various electronics components that not necessarily require direct access to the surroundings might be placed into the first printed electronics layer 12, like, for example, processors, batteries or antennas. Other electronics components like microphones that are used outside the aircraft cabin might be placed in the third printed electronics layer 22.

The printing process used to print the electronics layers 19*a* and 22 may be used to create electrical devices on a substrate. Printing processes employed therefor may use common printing equipment suitable for defining patterns on material, such as screen printing, flexography, gravure, offset lithography, and inkjet. Electrically functional electronic or optical inks may be deposited on the substrate, creating active or passive devices, such as thin film transistors, capacitors, coils, or resistors.

The electronics components printed in the layers 19*a* and 22 may include organic electronics or plastic electronics, in which one or more inks are composed of carbon-based compounds that can be deposited by solution-based, vacuum-based or other process. The electronics components may also include organic semiconductors, inorganic semiconductors, metallic conductors, nanoparticles or nanotubes.

For the preparation of the flexible printed electronics layers 19*a* and 22 nearly all industrial printing methods may be employed Similar to conventional printing, printed electronics may apply ink layers one atop another. One of the most important benefits of printing is low-cost volume fabrication.

The OLED assembly 10*a* may be deposited on the printed electronics layer 12, particularly by similar inkjet-printing or transfer-printing procedures as the printed electronics layer 12 itself. The OLED assembly 10*a* may comprise an OLED substrate 13 deposited on the printed electronics layer 12, an organic TFT array layer 14 deposited on the OLED substrate 13 and an OLED frontplane 18 deposited on the organic TFT array layer 14. The OLED frontplane 18 may be built up from an organic luminescent layer 15, a cathode layer 16 deposited on the organic luminescent layer 15 and an encapsulation layer 17 deposited on the cathode layer 16.

The material used for the OLED substrate 13 may, for example, be selected from the family of polyethylenes, but may also include glass, plastic or other suitable materials, or combinations thereof, with the required flexibility. The OLED substrate 13 may, for example, be opaque, reflective translucent, or transparent. It should be clear that the OLED assembly 10*a* may have different functional components such as an anode, cathode, and one or more organic layers disposed between the anode and cathode. Upon application of an appropriate voltage to the OLED frontplane 18, positive and negative charges combine in the organic luminescent layer 15 to emit light. The characteristics of this light, including brightness and color, depend at least in part on the applied voltage and properties of the organic luminescent layer 15. The encapsulation layer 17 may form an environmental barrier to lessen the exposure of the OLED assembly 10*a* to environmental elements such as air, oxygen, water, oils, radiation, and other elements with negative effects on the OLED assembly 10*a*. In some variations, the encapsulation layer 17 may also protect the OLED electronic components from direct environmental contact and shock. The encapsulation layer 17 may include glass, plastic, other suitable materials, or combinations thereof, with the required flexibility.

OLED displays may be categorized as bottom or top emission. In bottom emission OLED displays, the OLEDs emit light toward and through the substrate. Bottom emission may require a transparent or semi-transparent substrate and bottom electrode so that emitted light may pass through both layers. Top emission OLED displays include OLEDs that emit light opposite the substrate. The substrate of a top emission OLED display may be opaque, reflective, translucent, or transparent. As the component part 21 is usually opaque itself, the OLED assembly 10*a* may preferably be configured as a top emission OLED display, with a transparent encapsulation layer 17.

With the organic TFT array layer 14, the OLED assembly 10*a* may be configured as active matrix OLED display (AMOLED). An AMOLED display comprises an active matrix of OLED pixels in the organic luminescent layer 15 that are generating light by luminescence upon electrical activation. The organic luminescent layer 15 is deposited or integrated onto the organic TFT array layer 14 which is controlled as a series of switches to control the current flowing to each individual pixel. Typically, this continuous current flow is controlled by at least two TFTs at each pixel (to trigger the luminescence), with one TFT to start and stop the charging of a storage capacitor and the second to provide a voltage source at the level needed to create a constant current to the pixel, thereby eliminating the need for the very high currents required for passive-matrix OLED operation.

The organic TFT array layer 14 forms a TFT backplane of an AMOLED display. AMOLED displays do not require expensive backlights and generally have higher energy efficiency as compared to conventional OLED displays.

On top of the OLED assembly 10*a* a second printed electronics layer 19*a* may be formed, similar to the first printed electronics layer 12. The second printed electronics layer 19*a* may be formed by similar printing techniques as the first printed electronics layer 12 and may be protected by a protection cover layer 19*b* deposited on the second printed electronics layer 19*a*.

As shown in the example of FIG. 2, a third printed electronics layer 22 may additionally be deposited on the second main surface of the component part 21 opposite to the first main surface, similar to the first printed electronics layer 12. The third printed electronics layer 22 may be formed by similar printing techniques as the first printed electronics layer 12 and may be protected by a protection cover layer 23 deposited on the third printed electronics layer 22. The third printed electronics layer 22 may be supported by a flexible carrier substrate 22*a* that is arranged on the second main surface of the component part 21. The material of the flexible carrier substrate 22*a* may be selected depending on the material of the component part so that the carrier substrate 22*a* exhibits a strong chemical affinity to the material of the component part 21.

By providing separate printed electronics layer 12, 19*a* and/or 22, different functionalities may be integrated into different layers of the multifunctional electronics assembly or the aircraft cabin component 20 as a whole. For example, the first printed electronics layer 12 may include printed circuitry working as speakers and the third printed electronics layer 22 may include printed circuitry working as microphones. This will enable the aircraft cabin component 20 to work as a full-screen display with the additional benefit of reducing unwanted environmental noises such as from the engines and from mechanical vibrations.

Figure 3:
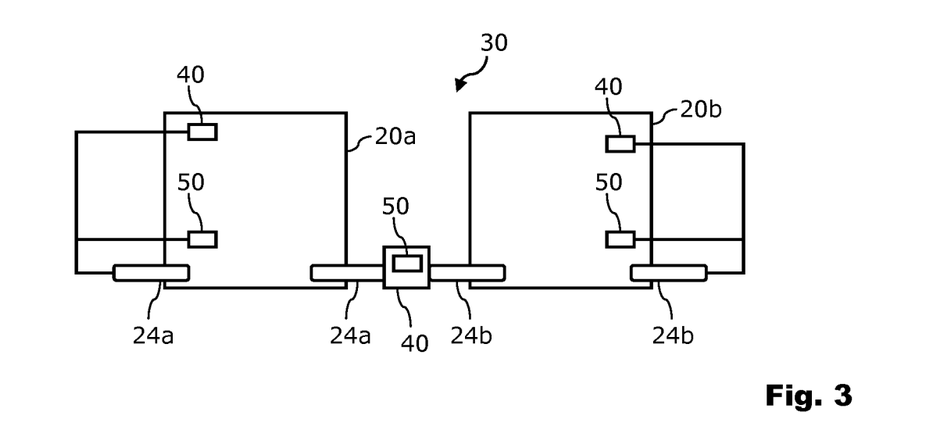
FIG. 3 schematically illustrates an aircraft cabin component assembly with two connected aircraft cabin components according to further embodiments of the invention.

As schematically illustrated in FIG. 3, an active noise reduction controller 50 may be coupled to the speakers and the microphones of one or more aircraft cabin components 20a, 20b. The active noise reduction controller 50 may, for example, be integrated into a general electronics controller 40 controlling the operation of the various electronics components of the aircraft cabin components 20a, 20b. Moreover, the general electronics controller 40 may provide for synchronized control of the operations of neighboring aircraft cabin components 20a, 20b.

Generally, the placement of the active noise reduction controller 50 and/or the electronics controller 40 may be chosen depending on the desired functionality. For example, as shown in FIG. 3, an active noise reduction controller 50 and/or an electronics controller 40 may be embedded into one or more of the aircraft cabin components 20a, 20b. In that case, the active noise reduction controller 50 and/or the electronics controller 40 may be arranged in the one of the printed electronics layers 12, 19a or 22 and may be coupled to the remaining electronics components and/or the OLED assembly 10a via interconnections formed over the connector tabs of the substrates.

The microphones may be printed as matrix of microphones on a plastic foil within the electronics layer 22. This electronics layer 22 will be installed on the external cabin side instead of the passenger side like the electronics layers 12 and 19a. These microphones may record external noise. A layer of speakers may be printed on one or both of the electronics layers 12 and 19a. The external noise recorded by each microphone will be sent to the active noise reduction controller 50 which is then configured to output a noise dampening signal destructively interfering with the noise recorded by the microphones to the speakers. For example, the noise dampening signal may resemble the recorded noise out-phased by 180°. This signal conversion will be performed by the active noise reduction controller 50. The result will be a significant external noise reduction inside the cabin, advantageously reducing sonic fatigue for crew and passengers alike.

The connection of the electronics layers 12, 19a and/22 as well as the OLED assembly 10a may be ensured by connector tabs 24a, 24b connected to the edges of the layers. The connector tabs 24a, 24b may preferably be connected at the back, i.e., the second main surface of the component part in order to preserve the aesthetic appearance of the OLED display at the portions visible to the passengers within the aircraft cabin.

The connector tabs 24a, 24b may be already pre-formed in the shape of the carrier substrates 11 and/or 22a. For example, the carrier substrates 11 and/or 22a may be punched from a larger sheet of material so that the connector tabs 24a, 24b are integrally formed with the carrier substrates 11 and/or 22a.

FIG. 4 schematically illustrates an aircraft A that has an aircraft cabin equipped with one or more aircraft cabin components 20, 20a, 20b as shown and explained in conjunction with FIGS. 1 and 2. Additionally or alternatively, the aircraft A may include an aircraft cabin component assembly 30 having two or more interconnected aircraft cabin components 20a, 20b as shown and explained in conjunction with FIG. 3.

Figure 5:
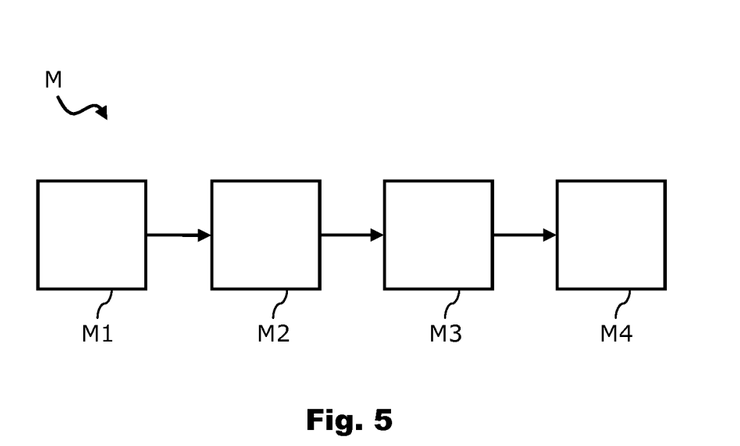
FIG. 5 shows a flow diagram of a method for manufacturing an aircraft cabin component according to some further embodiments of the invention.

FIG. 5 shows a flow diagram which schematically represents a method M for manufacturing an aircraft cabin component, particularly an aircraft cabin component 20 as shown and explained in conjunction with FIGS. 1 and 2. The method M may be performed in order to manufacture an aircraft cabin component 20 or the aircraft cabin component assembly 30 of FIG. 3 for an aircraft, such as the passenger aircraft A as explained and illustrated in conjunction with FIG. 4.

In a first stage M1, an electronics layer 12 is printed on a flexible carrier substrate 11, on which in turn an OLED assembly 10a may be printed in a second stage M2. In a third stage M3, a flexible carrier substrate 11 is deposited on a parametric surface of a component part so that the flexible carrier substrate 11 adheres to the at least one parametric surface of the component part 21 and fits closely the curvature of the parametric surface. The material of the flexible carrier substrate 11 is chosen in such a way that the chemical affinity between the flexible carrier substrate 11 and the material of the component part ensures a strong adhesion between the two.

The printing processes may advantageously involve inkjet-printing or transfer-printing. Those printing methods are used to create electrical devices on various substrates, typically using common printing equipment suitable for defining patterns on material, such as screen printing, flexography, gravure, offset lithography, and inkjet on a low cost basis.

Electrically functional electronic or optical inks are deposited on the substrate, creating active or passive devices, such as thin film transistors, capacitors, coils, or resistors. Printed electronics may involve organic or plastic electronics material in which one or more ink materials are composed of or comprising carbon-based compounds and can be deposited by solution-based, vacuum-based or other processes. Printed electronics may also utilize any solution-based material, including organic semiconductors, inorganic semiconductors, metallic conductors, nanoparticles or nanotubes.

Printing on flexible substrates such as the flexible carrier substrate 11 allows electronics layers 12 to be placed on curved surfaces.

In an optional fourth stage M4, a further electronics layer 22 may be printed on a surface of the component part opposite to the parametric surface. This further printed electronics layer 22 and the first printed electronics layer may then be electrically interconnected through connector tabs of the flexible carrier substrate 11. Moreover, an electronics controller 40, either external to the aircraft cabin component or as component of one of the printed electronics layers 12 and 22, may be interconnected with the remaining electronics components through the connector tabs 24a, 24b, respectively. The connector tabs 24a, 24b may serve to connect the electronics modules in the various aircraft cabin components 20a, 20b to an electronics controller 40. The connector tabs 24a, 24b may be already pre-formed in the shape of the carrier substrates 11 and/or 22a. For example, the carrier substrates 11 and/or 22a may be punched from a larger sheet of material so that the connector tabs 24a, 24b are integrally formed with the carrier substrates 11 and/or 22a.

As shown in FIG. 3, the electronics controller 40 may, for example, be used to control the OLED displays and electronics components in each of the printed electronics layers or may further include an active noise reduction controller 50 that may be used to control speakers and microphones implemented in the various electronics layers 12, 22 in order to provide for an active noise reduction mechanism in an aircraft cabin.

The use and manufacture of aircraft cabin components in aircraft as described and explained above opens a new dimension to a variety of media and lightning scenarios fostering the passengers' experience and simplifying the maintenance tasks during the entire aircraft life cycle.

With the use of aircraft cabin components according to the invention in aircraft passenger cabins, cabin general lightning systems may be removed, while safety lightning/signs and passenger reading lights might remain. Associated workload at aircraft section level and Final Assembly Line level may advantageously decrease since it is no longer necessary to install additional cables, brackets or other lighting means. The throughput time on the integrator side, mainly at section level, may particularly be improved.

The invention enables a minimum of interference on the current industrial set-up for cabin parts manufacturing. A further plus is that the use of established technologies on the implementation level decreases the required development time for industrialization.

Airlines may soundly differentiate from competitors and provide a unique customer cabin experience, directly impacting the loyalty of airline customers. The airlines are provided with unique opportunities for advertising, marketing and mood influence, increasing ancillary revenues due to the advertising. Airlines may present information of the flight destination city/region/country so that passengers know what they shouldn't miss on their trip. This advertising could be performed together with public/private institutions, opening a new revenue stream for the airlines.

The invention offers potential new business lines for the aircraft manufacturer by enabling the provision of maintenance guides/videos for airline technicians, preferably through a password protected tactile area on the OLED display overlaid with a touch sensitive sensor area.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. Many other examples will be apparent to one skilled in the art upon reviewing the above specification.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

A aircraft
M method
M1 method step
M2 method step
M3 method step
M4 method step
10a OLED assembly
10b multifunctional electronics assembly
11 flexible carrier substrate
12 printed electronics layer
13 OLED substrate
14 OTFT array layer
15 OLED layer
16 cathode layer
17 encapsulation layer
18 frontplane stack
19a printed electronics layer
19b protection cover layer
20 aircraft cabin component
20a aircraft cabin component
20b aircraft cabin component
21 component part
22a flexible carrier substrate
22 printed electronics layer
23 protection cover layer
24a connector tab
24b connector tab
30 aircraft cabin component assembly
40 electronics controller
50 active noise reduction controller

The invention claimed is:

1. An aircraft cabin component for use in an aircraft cabin of an aircraft, the aircraft cabin component comprising:
an aircraft cabin component part having at least one curved parametric surface;
a flexible multifunctional electronics assembly adhering to the at least one curved parametric surface of the aircraft cabin component part and fitting closely a curvature of the at least one curved parametric surface, the flexible multifunctional electronics assembly comprising a first printed electronics layer and an OLED assembly deposited on the first printed electronics layer; and
a second printed electronics layer deposited on a surface of the aircraft cabin component part opposite to the at least one curved parametric surface, wherein one of the first and the second printed electronics layer comprises speakers and the respective other of the first and the second printed electronics layer comprises microphones.

2. The aircraft cabin component according to claim 1, wherein the OLED assembly comprises an OLED substrate deposited on the first printed electronics layer, an OLED TFT array layer deposited on the OLED substrate and an OLED frontplane deposited on the OLED TFT array layer.

3. The aircraft cabin component according to claim 2, wherein the OLED frontplane comprises an organic luminescent layer, a cathode layer deposited on the organic luminescent layer and an encapsulation layer deposited on the cathode layer.

4. The aircraft cabin component according to claim 1, further comprising:
a third printed electronics layer deposited on the flexible OLED assembly.

5. The aircraft cabin component according to claim 4, further comprising:
a protection cover layer deposited on the third printed electronics layer.

6. The aircraft cabin component according to claim 1, further comprising:
a first flexible carrier substrate arranged between the at least one curved parametric surface of the aircraft cabin component part and the first printed electronics layer of the flexible multifunctional electronics assembly, a material of the first flexible carrier substrate exhibiting a strong chemical affinity to a material of the aircraft cabin component part, the materials of the first flexible carrier substrate and the aircraft cabin component part having different chemical compositions so that the materials easily aggregate or bond and form a stable bonding zone where surfaces of the first flexible carrier substrate and the aircraft cabin component part touch each other.

7. The aircraft cabin component according to claim 1, wherein the aircraft cabin component part is one of a lining panel, a ceiling panel, a floor panel, a hatrack, a cabin door, a compartment separation module, a window blind, a luggage compartment door, a galley sidewall or a lavatory monument sidewall.

8. The aircraft cabin component according to claim 4, wherein at least one of the first printed electronics layer or the third printed electronics layer comprise one or more of temperature sensors, light intensity sensors, humidity sensors, moisture sensors, pressure sensors, smoke detection sensors, chemical sensors, touch sensors, speakers, antennas, RFID modules, light fidelity modules, memory elements, energy harvesting elements, photovoltaic cells, biosensors and accumulators.

9. The aircraft cabin component according to claim 1, further comprising:
a second flexible carrier substrate arranged between the aircraft cabin component part and the second printed electronics layer, the material of the second flexible carrier substrate exhibiting a strong chemical affinity to the material of the aircraft cabin component part, the materials of the second flexible carrier substrate and the aircraft cabin component part having different chemical compositions so that the materials easily aggregate or bond and form a stable bonding zone where surfaces of the second flexible carrier substrate and the aircraft cabin component part touch each other.

10. An aircraft cabin component assembly, comprising:
at least one aircraft cabin component according to claim 1; and
an active noise reduction controller coupled to the speakers and the microphones of the at least one aircraft cabin component, the active noise reduction controller being configured to receive noise recorded by the microphones and to output a noise dampening signal destructively interfering with the noise recorded by the microphones to the speakers.

11. An aircraft comprising an aircraft cabin equipped with at least one aircraft cabin component according to claim 1.

12. An aircraft comprising an aircraft cabin equipped with at least one aircraft cabin component assembly according to claim 10.

13. A method for manufacturing the aircraft cabin component of claim 1, the method comprising:
printing an electronics layer on a flexible carrier substrate to form the first printed electronics layer on the flexible carrier substrate;
printing the OLED assembly on the printed electronics layer;
depositing the flexible carrier substrate on the at least one curved parametric surface of the aircraft cabin component part so that the flexible carrier substrate adheres to the at least one curved parametric surface of the aircraft cabin component part and fits closely the curvature of the at least one curved parametric surface.

14. The method of claim 13, further comprising:
printing a further electronics layer on a surface of the aircraft cabin component part opposite to the curved parametric surface to form the second printed electronics layer.

15. The method of claim 14, wherein the flexible carrier substrate comprises a connector tab through which at least one of the first printed electronics layer or the second printed electronics layer are electrically connected to at least one of each other or to an electronics controller external to the aircraft cabin component.

* * * * *